(12) United States Patent
Hendron et al.

(10) Patent No.: US 10,099,624 B2
(45) Date of Patent: Oct. 16, 2018

(54) STORAGE APPARATUS FOR AN OPERATORS STATION IN A WORK VEHICLE

(71) Applicant: Deere & Company, Moline, IL (US)

(72) Inventors: Scott S. Hendron, Dubuque, IA (US); Wylie C. Pfaff, Dubuque, IA (US); Robert C. Moore, Dubuque, IA (US); Martti Johannes Lampela, Newbury Park, CA (US); John William Krieger, Newbury Park, CA (US); Peter Fraser Falt, Newbury Park, CA (US); Michael McLaughlin, Newbury Park, CA (US)

(73) Assignee: Deere & Company, Moline, IL (US)

( * ) Notice: Subject to any disclaimer, the term of this patent is extended or adjusted under 35 U.S.C. 154(b) by 57 days.

(21) Appl. No.: 15/448,214

(22) Filed: Mar. 2, 2017

(65) Prior Publication Data

US 2018/0251073 A1  Sep. 6, 2018

(51) Int. Cl.
*B60R 7/04* (2006.01)
*B60N 2/38* (2006.01)
*E02F 9/16* (2006.01)
*B60N 2/90* (2018.01)
*E02F 3/96* (2006.01)

(52) U.S. Cl.
CPC .............. *B60R 7/043* (2013.01); *B60N 2/38* (2013.01); *B60N 2/90* (2018.02); *E02F 9/16* (2013.01); *E02F 9/166* (2013.01); *E02F 3/964* (2013.01)

(58) Field of Classification Search
CPC . B60N 2/14; B60N 2/143; B60N 2/38; B60N 2/90; B60R 7/043; B62D 33/00; E02F 3/286; E02F 3/964; E02F 9/16
USPC ....................................... 296/37.16
See application file for complete search history.

(56) References Cited

U.S. PATENT DOCUMENTS

| | | | | |
|---|---|---|---|---|
| 2,711,213 A * | 6/1955 | Owens | ................... | B60N 3/103 248/231.81 |
| 6,386,612 B2 | 5/2002 | Hofmann | | |
| 7,318,616 B1 * | 1/2008 | Bradley | ................. | B60N 2/206 296/37.15 |
| 2008/0143161 A1* | 6/2008 | Ayabe | ..................... | B60N 2/06 297/344.24 |

FOREIGN PATENT DOCUMENTS

| | | | | |
|---|---|---|---|---|
| FR | 2661142 A1 * | 10/1991 | ............. | B60N 2/206 |
| FR | 2710297 A1 * | 3/1995 | ............. | B60R 7/043 |
| JP | 05345544 A * | 12/1993 | ............. | F25B 21/02 |
| JP | 2005096534 A | 4/2005 | | |

\* cited by examiner

*Primary Examiner* — Jason S Daniels

(57) ABSTRACT

A storage apparatus for a work vehicle where the work vehicle comprises an operator's station defining a floor, a seat assembly coupled to the floor, wherein the seat assembly is rotatable about a seat assembly pivot axis between a forward facing position and a rearward facing position. The storage apparatus comprises at least one drawer support coupled to a backside of the seat assembly, and at least one drawer slidably disposed with the drawer support where the drawer is movable between an access position and a storage position.

13 Claims, 8 Drawing Sheets

STORAGE APPARATUS FOR AN OPERATORS STATION IN A WORK VEHICLE

CROSS-REFERENCE TO RELATED APPLICATIONS

N/A

FIELD OF THE DISCLOSURE

The present disclosure relates to a storage apparatus for an operator's station in a work vehicle. More particularly, the disclosure relates to a storage apparatus as it relates to a swivel seat.

BACKGROUND

There are work vehicles having multiple work operation stations that require a swivel seat to allow an operator to switch between the work operation stations or areas. Backhoe loaders are a type of work vehicle for performing two work operations and that have two work operation stations. The backhoe loader is provided with a loader-style bucket on the forward end and a backhoe on the rearward end. The operator station is provided with a swivel seat which faces to the front for transport and loading operations and to the back for backhoe operations.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a storage apparatus for a work vehicle. The work vehicle comprises an operator's station that defines a floor, a seat assembly coupled to the floor where the seat assembly is rotatable about a seat assembly pivot axis between a forward facing position and a rearward facing position.

According to an aspect of the present disclosure, the storage apparatus comprises at least one drawer support coupled to the backside of the seat assembly, and at least one drawer slidably disposed with the drawer support, the drawer being movable between an access position and a storage position.

The drawer support may be arcuate. The drawer support may also be coaxial with the seat assembly pivot axis.

Furthermore, the drawer may move along a path of travel coaxial with the seat assembly pivot axis (e.g. circular, elliptical) when moved between the access position and the storage position.

The drawer support may further comprise at least one pair of rails, and the drawer may comprise at least one pair of rollers, where the rollers are slidably disposed in the rails to facilitate movement of the drawer with respect to the drawer support.

The storage apparatus may further comprise a detent mechanism.

The storage apparatus may further comprise a plurality of storage supports coupled vertically along the backside of the seat assembly, and a plurality of drawers slidably disposed with respect to each storage support between an access position and a storage position.

According to another aspect of the disclosure, an apparatus for a work vehicle comprises at least one drawer support coupled to a backside of the seat assembly, at least one drawer slidably disposed with the drawer support, the drawer being movable between an access position and a storage position, a user input device, a drawer actuator coupled to the drawer, and a controller configured to receive an input signal from the user input device, and output a control signal to the drawer actuator to cause the drawer to move between an access position and a storage position.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
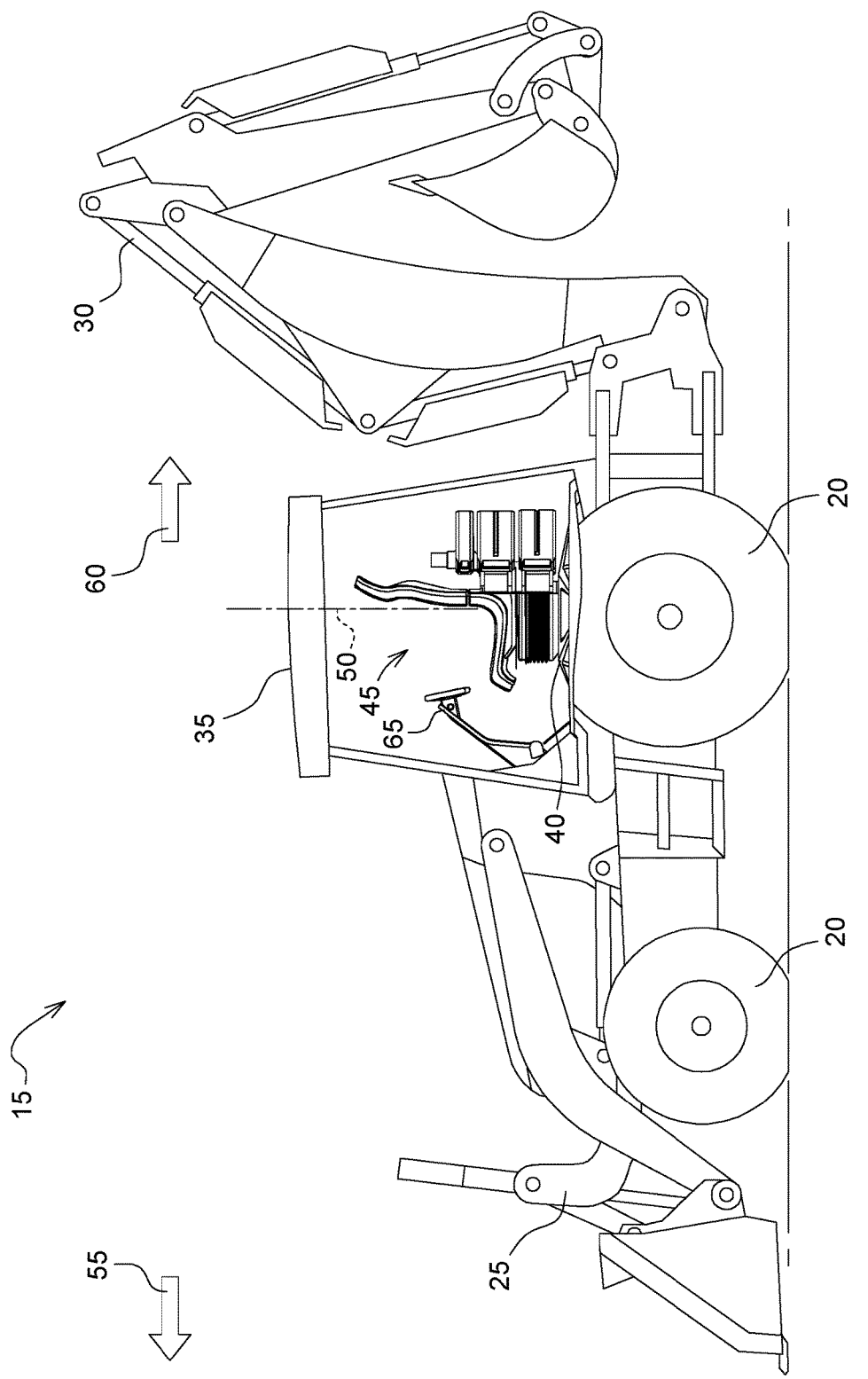
FIG. 1 is a side view of a backhoe loader, with a portion of the operator's station hidden.

Referring to FIG. 1, an exemplary body of a work vehicle 15, such as a backhoe loader, is shown. This disclosure is not intended to be limited to a backhoe loader, however, but rather may include any agricultural, construction, or forestry machinery where a seat rotates from one position to another to allow an operator to switch between two or more work operation stations or areas (not shown). The work vehicle 15 is provided with a ground engaging mechanism 20 for moving along the ground. Work vehicle 15 is equipped with a loader-style bucket 25 on one end and a backhoe 30 on the other end. An operator's station 35 is coupled to the work vehicle 15. The operator's station defines a floor 40, a seat assembly 45 coupled to the floor 40, wherein the seat assembly 45 is rotatable about a seat assembly pivot axis 50 between a forward facing position 55 and a rearward facing position 60. In this embodiment, the seat assembly is rotatable to allow the operator to toggle between the work operator station 65 of the loader-style bucket and the backhoe (not shown).

Figure 2:
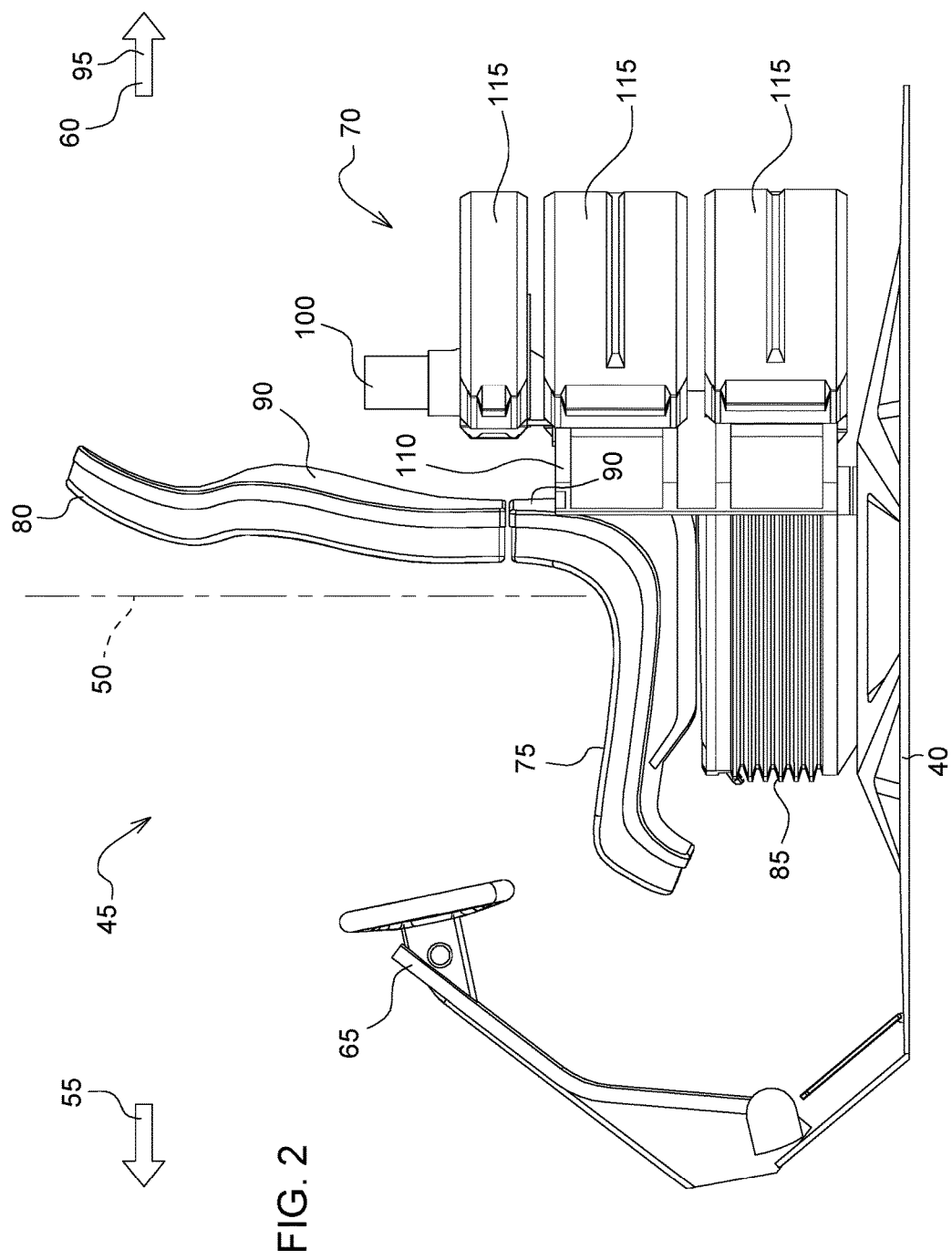
FIG. 2 is a side view of a portion of the operator's station according to one embodiment.

Referring now to FIG. 2, a side view of a portion of the operator's station is presented. More particularly, a seat assembly 45 coupled with the floor 40 of the operator's station 35 wherein the seat assembly 45 is further coupled with the storage apparatus 70 is shown. The seat assembly 45 may come in several configurations provided the seat assembly 45 is rotatable about a vertical axis, also known as a seat assembly pivot axis 50. In this embodiment, the seat assembly 45 includes a seat cushion 75 for supporting an operator seated thereon and a seat back cushion 80 for supporting the back of an operator seated on the seat cushion. The seat cushion 75 is mounted on a seat mounting assembly 85. The seat mounting assembly 85 may provide a means for adjusting the seat cushion 75 and seat back cushion 80 in one of several directions—vertical, tilt, and between the forward and rearward positions, and the ability to absorb shock as the work vehicle 15 travels through rough terrain. A backside 90 of the seat assembly 45 is defined as any surface on the seat assembly opposite the direction the operator is facing when seated 95 (per FIG. 2). In the embodiment shown in FIG. 2, the backside 90 of the seat assembly 45 may be the backside of the seat mounting assembly 85, the seat cushion 75, the seat back cushion 80, or any extension thereof.

Figure 3:
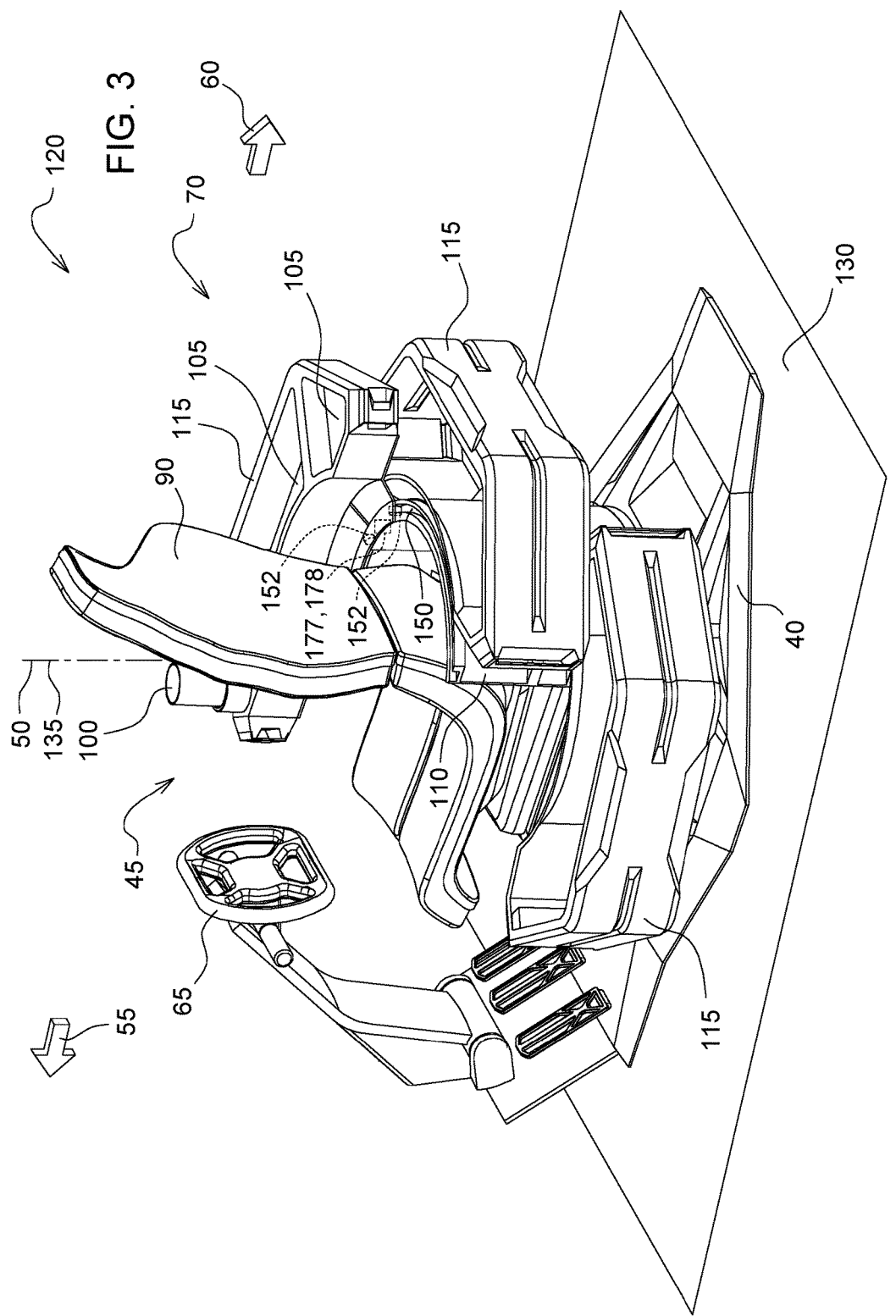
FIG. 3 is a perspective view of a portion of the operator's station according to one embodiment with the storage apparatus in an access position.

A storage apparatus 70 is located within the operator's station 35. The storage apparatus may be utilized to hold tools, small parts related to the service of the work vehicle, heavy clothing, safety equipment, electronic equipment, cell phones and food and water. The storage apparatus 70 may further comprise at least one cup holder 100 to hold beverages. Each drawer 115 may be further compartmentalized with several pockets 105 (shown in FIG. 3) to store particular items. The storage apparatus 70 comprises at least one drawer support 110 coupled to a portion of the backside 90 of the seat assembly 45, and at least one drawer 115 disposed with the drawer support 110, the drawer 115 being movable between an access position 120 (shown in FIG. 3) and a storage position 125 (shown in FIG. 5). FIGS. 2 and 3 exemplify a drawer support 110 with a plurality of drawers 115. The coupling of the storage apparatus 70 to a backside 90 of the seat assembly 45 allows the operator to freely maneuver their seat 45 between the forward facing position 55 and a rearward facing position 60 without inconveniencing the operator by requiring them to either move or step over items stored/placed on the floor 40. Furthermore, the relative positioning of the drawer 115 to the drawer support 110 as coupled to the backside 90 of the seat assembly 45 allows for the operator's ease of access to items stored therein. More particularly, the configuration as shown in FIG. 3 allows for ease of accessibility while the operator remains in a seated position.

As shown in FIGS. 2 and 3, the drawer support 110 is arcuate wherein the drawer support 110 partially wraps around the seat assembly 45. The drawer support 110 may also be arcuate in a plane 130 parallel with the floor 40 of the operator's station 35. In the particular embodiment shown, the axis 135 of drawer support 110 is coaxial with the seat assembly pivot axis 50. The drawer support 110 may be stationary, fixedly attached to a portion of the backside 90 of the seat assembly 45. Alternatively, the drawer support 110 may rotate about the seat assembly 45 up to ninety degrees in either the clockwise or the counter-clockwise direction. In some instances, the drawer support 110 may move along a path of travel 140 coaxial with the seat assembly pivot axis 50 (as shown in FIG. 4), for example circular or elliptical.

FIG. 3 exemplifies one embodiment of the storage apparatus 70 in the access position 120. This particular configuration shows two of three drawers 115 in their fully extended position. Although not shown, the central drawer may also rotate outwards to an access position 120. An operator may easily reach for stored items while remaining in a seated position. FIG. 3 further demonstrates a cup holder 100 as located in the topmost drawer 115. Although this particular configuration demonstrates a series of three drawers as coupled vertically with a drawer support 110, it should be noted the design is modular, stackable and is customizable based on the needs of the operator, thereby the storage apparatus may comprise only one drawer 115 or a plurality of drawers 115, and either one drawer support 110 or a plurality of drawer supports 110.

Figure 4:
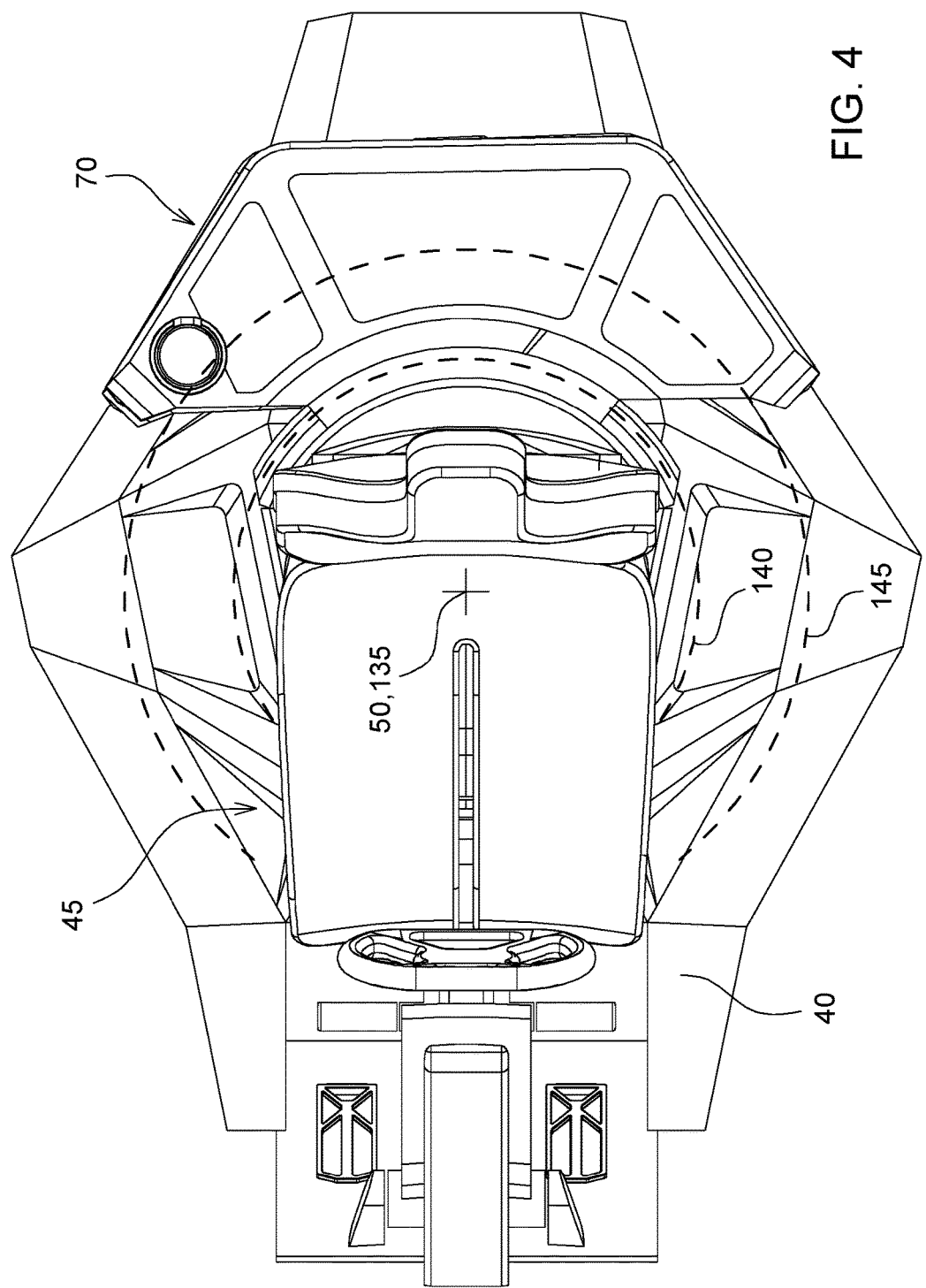
FIG. 4 is a top view of a portion of the operator's station according to one embodiment.

Now turning to FIG. 4, a top view of a portion of the operator's station 35 is shown. More particularly, a seat assembly 45 coupled with the operator station floor 40, and storage apparatus 70 is shown. Similar to the path of travel 140 of the drawer support 110, the drawer 115 may also move along a path of travel 145 coaxial with the seat assembly pivot axis 50 (e.g. circular or elliptical) when moved between the access position 120 (shown in FIG. 3) and the storage position 125 (shown in FIG. 5).

Figure 5:
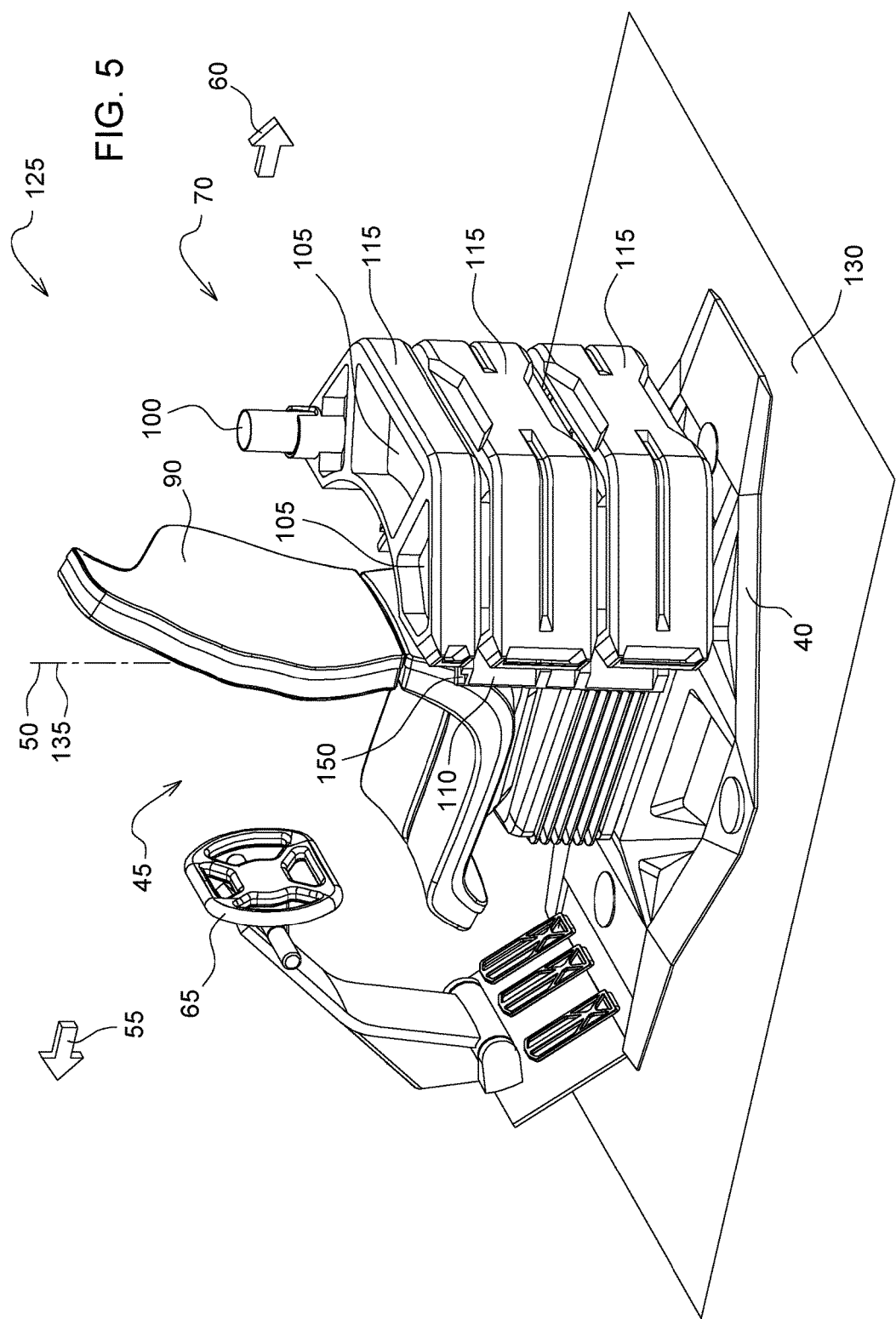
FIG. 5 is a perspective view of a portion of the operator's station according to one embodiment with the storage apparatus in a storage position.

FIG. 5 is a perspective view of a portion of the operator's station according to one embodiment with the storage apparatus 70 in a storage position 125.

Now returning to FIG. 3, the drawer 115 and the drawer support 110 may be coupled through various means. In one embodiment, the drawer support 110 may comprise at least one pair of rails 150, and the drawer 115 may comprise of at least one pair of rollers 152, the rollers 152 being slidably disposed in the rails 150 to facilitate movement of the drawer 115 with respect to the drawer support 110. The drawer 115 may be accessed by pulling outwardly. Alternatively, if movement of the drawer 115 from a storage position 125 to an access position 120 were automated, coupling of the drawer and the drawer support may utilize a toothed gear system with chain to facilitate drawer movement, or some other method conducive to automation.

Figure 6:
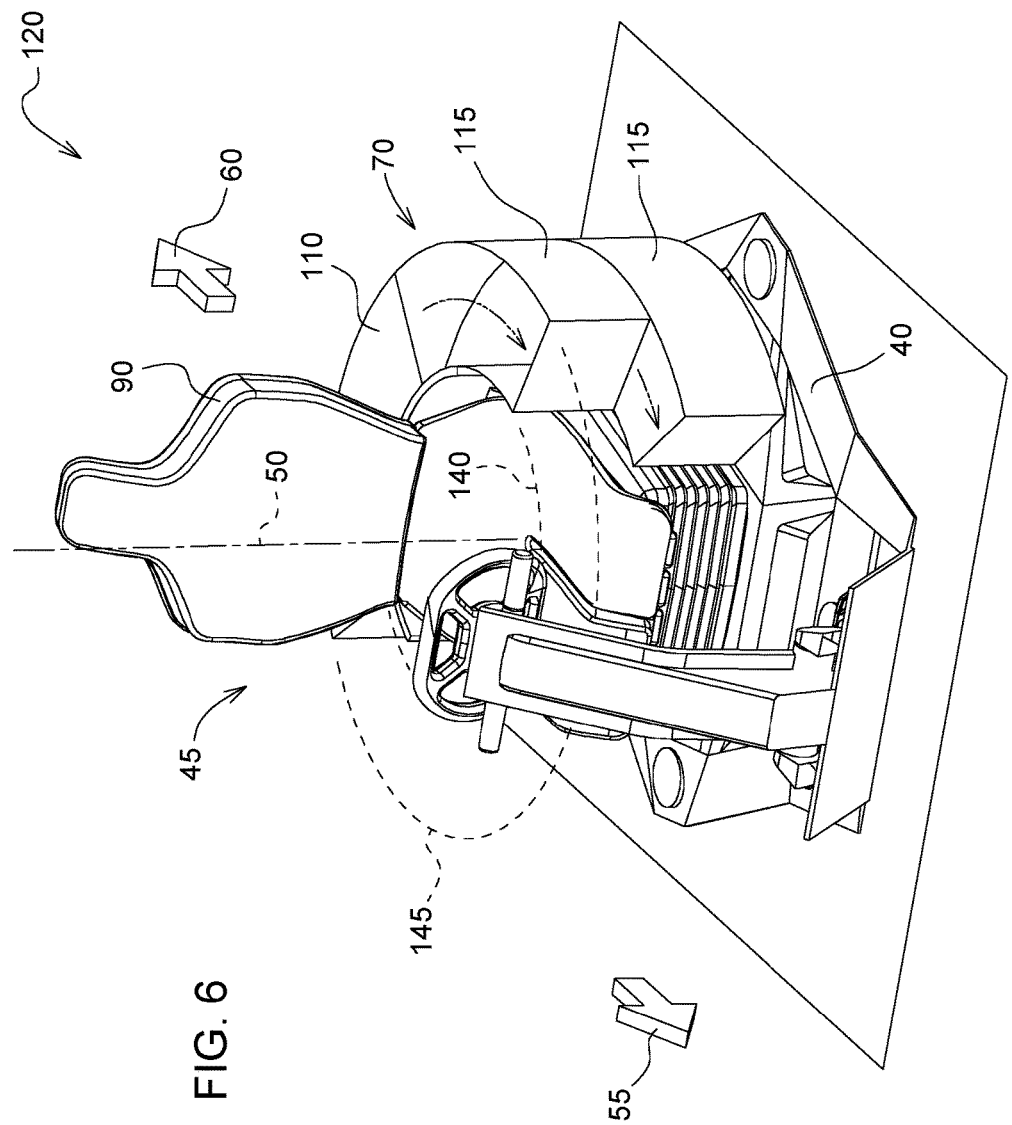
FIG. 6 is a perspective view of a portion of the operator's station according to another embodiment with the storage apparatus in a storage position.
Figure 7:
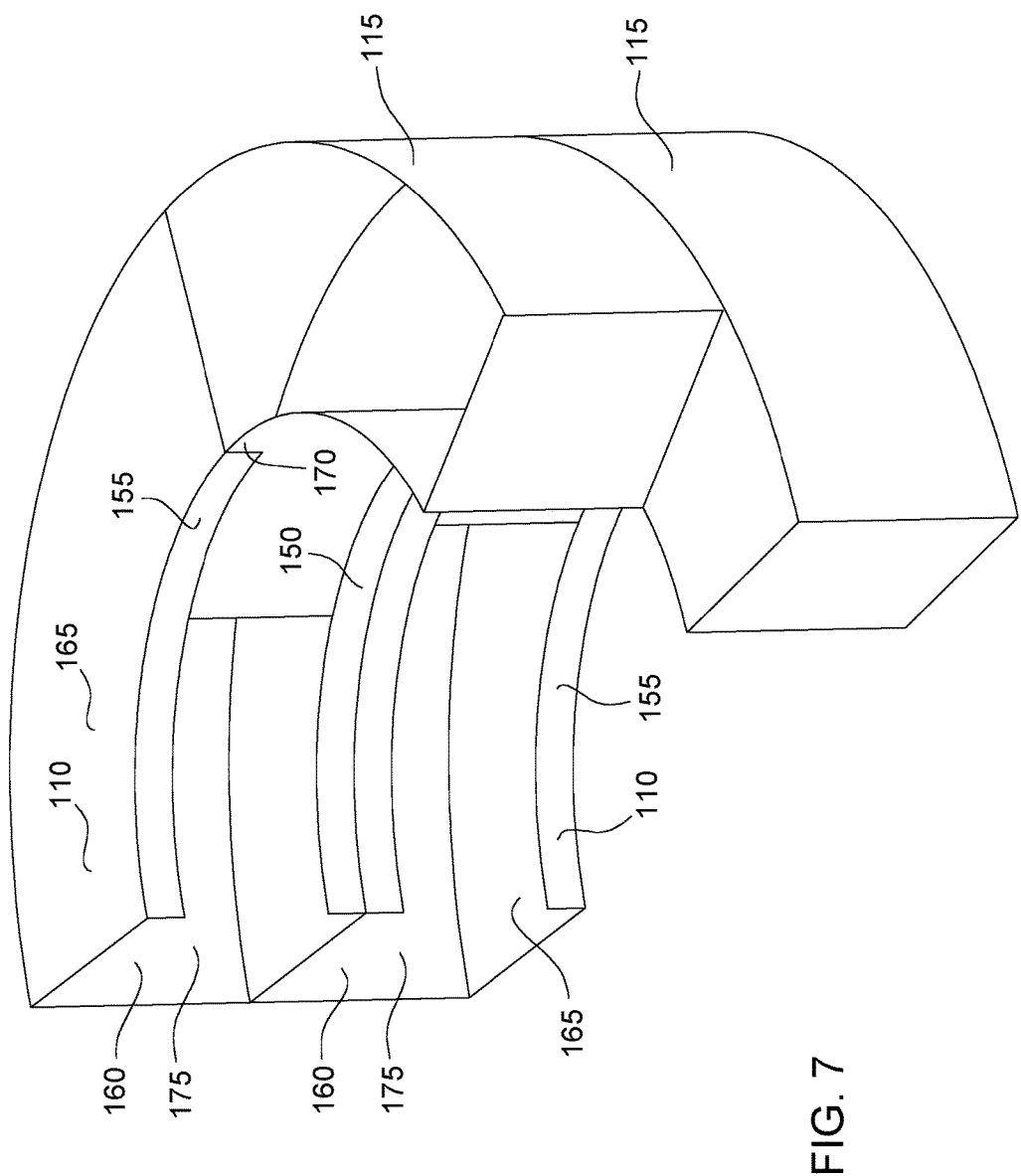
FIG. 7 is a perspective view of a portion of the drawer support with drawers of the storage apparatus according to the embodiment shown in FIG. 6.

Now turning to FIGS. 6 and 7, in another embodiment, a storage apparatus 70 for a work vehicle 15 is shown. FIG. 6 shows a portion of the operator's station 35 defining a floor 40, a seat assembly 45 coupled to the floor 40, wherein the seat assembly 45 is rotatable about a seat assembly pivot axis 50 between a forward facing position 55 and a rearward facing position 60. The storage apparatus 70 comprises at least one drawer support 110 coupled to a backside 90 of the seat assembly 45, and at least one drawer 115 slidably disposed with the drawer support 110, the drawer 115 being movable between an access position 120 (shown in FIGS. 6 and 8) and a storage position 125 (not shown). Referring now to FIG. 7, the drawer support 110 comprises a first arcuate surface 155, a second surface 160 spaced apart from the first arcuate surface 155, at least one surface 165 coupling the first arcuate surface 155 to the second surface 160, and a first side opening 170 into the space between the first arcuate surface 155 and the second surface 160 wherein the drawer 115 is slidably disposed with the first side opening 170. In this particular embodiment, the first arcuate surface 155, the second surface 160 spaced apart from the first arcuate surface 155, and at least one surface 165 coupling the first arcuate surface 155 and the second surface 160 creates a partial enclosure housing the drawer 115. The drawer support 110 may comprise a second side opening 175 wherein an additional drawer 115 is slidably disposed (not shown). The drawer support 110 may alternatively comprise a singular drawer 115 slidably disposed within the drawer support 110, wherein the drawer 115 may slide in either the clockwise or counter-clockwise direction. In the embodiment shown, the drawer 115 may move along a path of travel 145 coaxial (shown in FIG. 6) with the seat assembly pivot axis 50. Additionally, the drawer support 110 may also move relative to the seat assembly 45 along a path travel 140 coaxial with seat assembly pivot axis 50.

Returning now to FIG. 3, the storage apparatus may also comprise a detent mechanism 177. As previously discussed, the drawer support 110 comprises at least one pair of rails 150, and the drawer 115 comprises at least one pair of rollers 152, the rollers 152 being slidably disposed in the rails 150 to facilitate movement of the drawer 115 with respect to the drawer support 110. In one exemplary detent mechanism 177, the rails may comprise a protrusion 178 in a predetermined location to limit the extent of travel of the drawer 115 wherein the protrusion 178 limits movement of the rollers 152.

Now referring to FIG. 2, the storage apparatus 70 may comprise a plurality of drawer supports 110 coupled vertically along the backside 90 of the seat assembly 45, and a plurality of drawers 115 slidably disposed with respect to each drawer support 110 between an access position 120 and a storage position 125 (as shown in FIGS. 3 and 5, respectively). The use of a plurality of drawer supports 110 and/or drawers 115 creates a design that is modular, stackable and customizable based on the needs of the operator.

Figure 8:
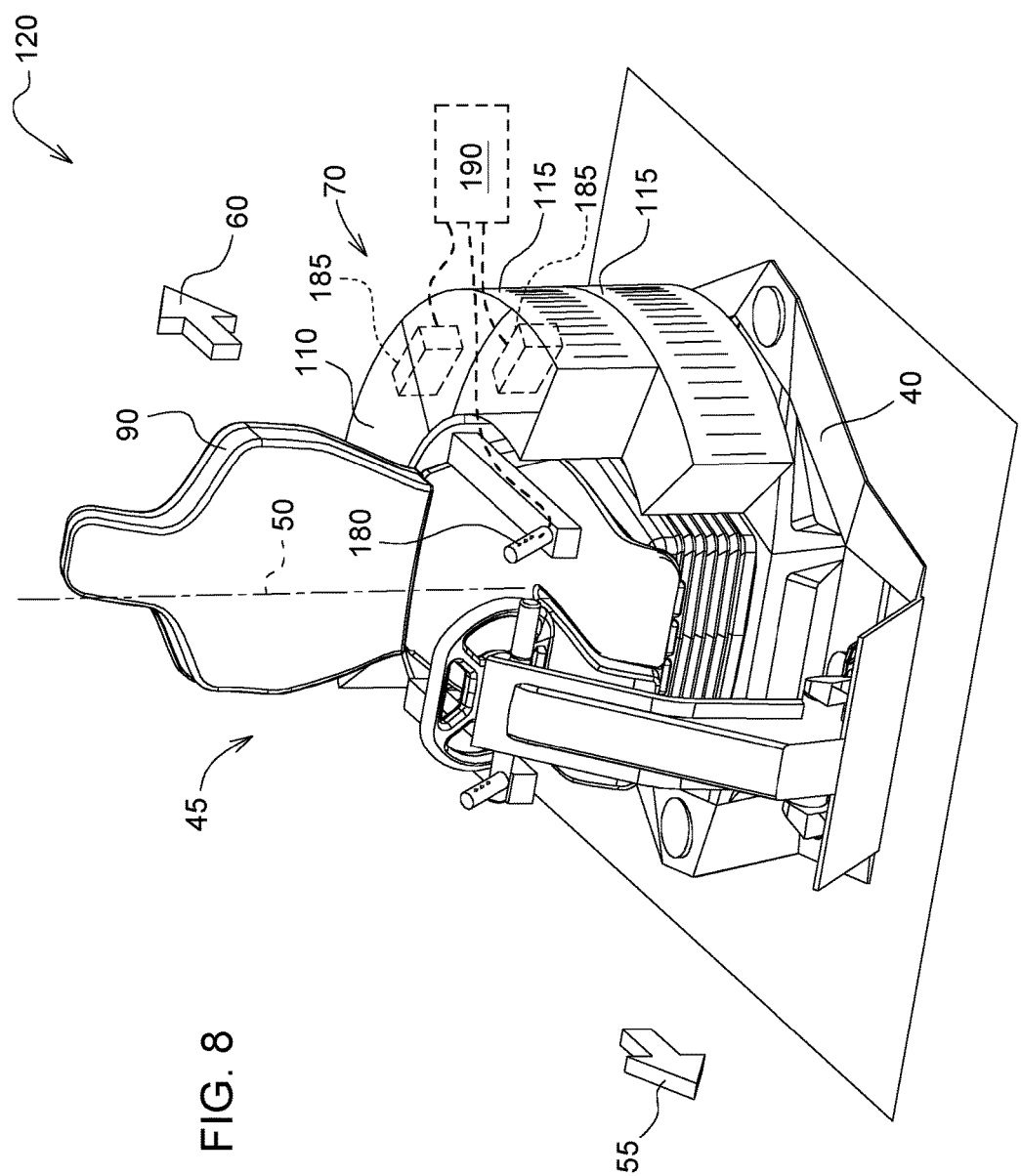
FIG. 8 is a perspective view of a portion of the alternative embodiment.

Now turning to FIG. 8, an alternative embodiment of a storage apparatus 70 for a work vehicle 15, comprising at least one drawer support 110 coupled to a backside 90 of the seat assembly 45, at least one drawer 115 slidably disposed with the drawer support 110, the drawer 115 being movable between an access position 120 and a storage position 125, a user input device 180, a drawer actuator 185 coupled to the drawer 115, and a controller 190 configured to receive an input signal from the user input device 180, an output a control signal to the drawer actuator 185 to cause the drawer 115 to move between an access position 120 and a storage position 125. The user input device 180 may be one of either a touchscreen, a joystick, lever, button, voice command, or any other feature that allows an operator to initiate an input signal to the controller 190. A drawer actuator 185 may be one of several means to move the drawer 115 between an access position 120 and a storage position 125 (e.g. a motor).

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A storage apparatus for a work vehicle, the work vehicle comprising an operator's station defining a floor, a seat assembly coupled to the floor, wherein the seat assembly is rotatable about a seat assembly pivot axis between a forward facing position and a rearward facing position, the storage apparatus comprising:
   at least one drawer support coupled to a backside of the seat assembly, and
   at least one drawer slidably disposed with the drawer support, the drawer being movable between an access position and a storage position, wherein the drawer support is arcuate, and is coaxial with the seat assembly pivot axis.

2. The storage apparatus of claim 1, wherein the drawer support moves along a path of travel coaxial with the seat assembly pivot axis.

3. The storage apparatus of claim 1, wherein the drawer moves along a path of travel coaxial with the seat assembly pivot axis when moved between the access position and the storage position.

4. The storage apparatus of claim 1, wherein the drawer support further comprises at least one pair of rails, and the drawer comprises at least one pair of rollers, the rollers being slidably disposed in the rails to facilitate movement of the drawer with respect to the drawer support.

5. The storage apparatus of claim 1, wherein the storage apparatus further comprises a detent mechanism.

6. The storage apparatus of claim 1, wherein the storage apparatus further comprises:
   a plurality of storage supports coupled vertically along the backside of the seat assembly, and
   a plurality of drawers slidably disposed with respect to each storage support between an access position and a storage position.

7. A work vehicle comprising:
   a vehicle body frame extending in the forward and rearward direction,
   an operator's station coupled to the vehicle body frame, the operator's station defining a floor, a seat assembly coupled to the floor, wherein the seat assembly is rotatable about a seat assembly pivot axis between a forward facing position and a rearward facing position,
   and a storage apparatus comprising at least one drawer support coupled to a backside of the seat assembly and at least one drawer slidably disposed with the drawer support, the drawer being movable between an access position and a storage position, wherein the drawer support is arcuate, and is coaxial with the seat assembly pivot axis.

8. The work vehicle of claim 7, wherein the drawer support moves along a path of travel coaxial with the seat assembly pivot axis.

9. The work vehicle of claim 7, wherein the drawer moves along a path of travel coaxial with the seat assembly pivot axis when moved between the access position and the storage position.

10. The work vehicle of claim 7, wherein the drawer support comprises at least one pair of rails and the drawer comprises at least one pair of rollers, the rollers being slidably disposed in the rails to facilitate movement of the drawer with respect to the drawer support.

11. The work vehicle of claim 7, wherein the storage apparatus further comprises a detent mechanism.

12. The work vehicle of claim 7, wherein the storage apparatus further comprises:
   a plurality of storage supports coupled vertically along the backside of the seat assembly, and
   a plurality of drawers slidably disposed with respect to each storage support between an access position and a storage position.

13. An apparatus for a work vehicle, comprising:
   at least one drawer support coupled to a backside of a seat assembly rotatable about a pivot axis, at least one drawer slidably disposed with the drawer support, the drawer being movable between an access position and a storage position along a path coaxial with the seat pivot axis,
a user input device,
a drawer actuator coupled to the drawer, and
a controller configured to receive an input signal from the user input device, and output a control signal to the drawer actuator to cause the drawer to move between an access position and a storage position.

* * * * *